(12) United States Patent  
Nakajo

(10) Patent No.: US 7,331,710 B2  
(45) Date of Patent: Feb. 19, 2008

(54) CASSETTE FOR USE IN RADIATION IMAGE FORMING APPARATUS

(75) Inventor: Masakazu Nakajo, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 362 days.

(21) Appl. No.: 11/024,831

(22) Filed: Dec. 30, 2004

(65) Prior Publication Data

US 2005/0155886 A1 Jul. 21, 2005

(30) Foreign Application Priority Data

Jan. 16, 2004 (JP) ............................. 2004-009339

(51) Int. Cl.
*G03B 42/04* (2006.01)
(52) U.S. Cl. ....................... 378/188; 206/455
(58) Field of Classification Search ................ 206/449, 206/555, 454–456; 250/484.4; 271/145; 378/182, 185, 188
See application file for complete search history.

(56) References Cited

U.S. PATENT DOCUMENTS 5,441,251 A * 8/1995 Ohta ..................... 378/188
5,806,844 A * 9/1998 Bailey et al. ............... 271/145
6,227,732 B1 * 5/2001 Higuchi et al. ............. 206/449
6,412,772 B1 * 7/2002 Itoh et al. ................. 271/145
6,557,705 B1 * 5/2003 Nakajo et al. ............. 206/455
6,669,363 B2 * 12/2003 Nakajo ...................... 378/182
7,114,617 B2 * 10/2006 Yewdall et al. ............ 206/440

FOREIGN PATENT DOCUMENTS

| JP | 6-19021 A | 1/1994 |
| JP | 2000-249795 A | 9/2000 |
| JP | 2002-250980 A | 9/2002 |
| JP | 2003-207864 A | 7/2003 |
| JP | 2003-270747 A | 9/2003 |

* cited by examiner

*Primary Examiner*—Luan K Bui
(74) *Attorney, Agent, or Firm*—Sughrue Mion, PLLC

(57) ABSTRACT

A spring is mounted on a side of a stimulable phosphor sheet. A cassette for use in radiation image forming apparatus includes a housing and a lid hinged thereto. When the lid is closed over the housing with the stimulable phosphor sheet inserted in the cassette, the stimulable phosphor sheet is lowered toward a bottom surface of the housing, and the spring presses a side wall of the housing and is also lowered toward the bottom surface. The stimulable phosphor sheet is positioned and held with respect to the side wall by the spring, and housed in a space defined by the housing and the lid.

11 Claims, 16 Drawing Sheets

CASSETTE FOR USE IN RADIATION IMAGE FORMING APPARATUS

BACKGROUND OF THE INVENTION

1. Field of the Invention

The present invention relates to a cassette for use in radiation image forming apparatus for storing a radiation image recording medium on which to record radiation image information of a subject.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display unit such as a CRT or the like.

The stimulable phosphor is a phosphor which, when exposed to an applied radiation (X-rays, α-rays, β-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet.

It has been practiced to apply a radiation, e.g., X-rays, to a subject such as a human body, to record radiation image information of the subject directly on a photographic film. The radiation image information recorded on the photographic film is subsequently developed into a visible image, which will be used for a medical diagnosis or the like.

Each radiation image recording medium such as a stimulable phosphor sheet or a photographic film is usually housed in a cassette and loaded into an exposure apparatus where X-rays are applied to the radiation image recording medium through the cassette. Known cassettes of this type are disclosed in Japanese Laid-Open Patent Publication No. 2003-207864, Japanese Laid-Open Patent Publication No. 2003-270747, and Japanese Laid-Open Patent Publication No. 6-19021, for example.

FIG. 13 of the accompanying drawings shows in exploded perspective a mammographic cassette 100 to be placed along the chest wall of a subject, as disclosed in Japanese Laid-Open Patent Publication No. 2003-207864 and Japanese Laid-Open Patent Publication No. 2003-270747. The mammographic cassette 100 has a front plate 102 and a back plate 104. A stimulable phosphor sheet 106 is placed on the surface of the back plate 104 which faces the front plate 102. In FIG. 13, the mammographic cassette 100 is illustrated upside down.

FIG. 14 of the accompanying drawings shows in perspective the interior of the mammographic cassette 100 that is completed when the front plate 102 and the back plate 104 are combined with each other. In FIG. 14, the bottom of the back plate 104, which is opposite to the stimulable phosphor sheet 106, is omitted from illustration.

In the back plate 104, there are disposed a push latch 108, two springs 110a, 110b fixing the push latch 108 to the back plate 104 and normally biasing the push latch 108 in the direction indicated by the arrow Q1, a substantially U-shaped joint member 114 fixed to the back plate 104 by two springs 112a, 112b which normally bias the joint member 114 in the direction indicated by the arrow Q1, and four lock fingers 116, 118, 120, 122 connected to the joint member 114.

The push latch 108 houses a moving mechanism (not shown) therein. Each time a rod 136 is pressed, from outside of the cassette 100, against the push latch 108 in the direction indicated by the arrow Q2, the moving mechanism is actuated to move the push latch 108 in the direction indicated by the arrow Q1 or in the direction indicated by the arrow Q2.

In FIG. 14, the push latch 108 is shown as being displaced in the direction indicated by the arrow Q2 against the bias of the springs 110a, 110b in the direction indicated by the arrow Q1, and the joint member 114 is shown as being displaced in the direction indicated by the arrow Q2 against the bias of the springs 112a, 112b.

For putting the stimulable phosphor sheet 106 into the cassette 100, as shown in FIG. 13, the stimulable phosphor sheet 106 is placed on the surface of the back plate 104, and the front plate 102 and the back plate 104 are superposed on each other sandwiching the stimulable phosphor sheet 106.

Then, as shown in FIG. 14, the rod 136 is pressed, from outside of the cassette 100, against the push latch 108, actuating the moving mechanism. The push latch 108 is now displaced in the direction indicated by the arrow Q1 by the moving mechanism and under the bias of the springs 110a, 110b. The joint member 114 and the lock fingers 116 through 122 are released from the push imparted by the push latch 108 in the direction indicated by the arrow Q2, and displaced in the direction indicated by the arrow Q1 under the bias of the springs 112a, 112b.

The lock fingers 120, 122 engage respective link members 126, 128 that are connected to both ends of a frame 124 of the front plate 102, respectively. Therefore, the link members 126, 128 are also displaced in the direction indicated by the arrow Q1.

As shown in FIG. 15, the frame. 124 is turned in the direction indicated by the arrow Q3, causing a tip end 130 of the frame 124 to engage in a groove 132 in the back plate 104. The interior of the cassette 100 is now shielded from entry of light. The stimulable phosphor sheet 106 has an end face 134 held in abutment against an inner surface of the frame 124, and is held within the cassette 100.

The cassette 100 with the stimulable phosphor sheet 106 housed therein is then loaded into an exposure apparatus such that the frame 124 is placed against the chest wall of a subject. Then, radiation image information of the subject is recorded on the stimulable phosphor sheet 106 through the cassette 100.

FIG. 16 of the accompanying drawings shows a cassette 140 disclosed in Japanese Laid-Open Patent Publication No. 6-19021. As shown in FIG. 16, the cassette 140 has a base plate 144 supporting on its upper surface a covering layer 142 made of a light-stimulus emission material and a cap 146 which sandwiches the covering layer 142 in coaction with the base plate 144.

The base plate 144 has side faces 148 slanted from its upper surface toward its bottom surface and having holes 150 defined therein. The holes 150 house therein respective springs 152 secured to the base plate 144 and connected to respective retainer pins 154 which are slidably fitted in the holes 150 and project partly out from the holes 150.

The cap 146 has a top plate 156 facing the upper surface of the base plate 144 and side plates 158 extending from the ends of the top plate 156 obliquely downwardly facing the side faces 148 of the base plate 144. A cushion layer 160 is mounted on the lower surface of the top plate 156 facing the covering layer 142. The side plates 158 of the cap 146 have respective holes 162 defined therein for receiving the respective retainer pins 154.

When the cap 146 is lowered toward the covering layer 142 placed on the upper surface of the base plate 144, the side plates 158 of the cap 146 press the retainer pins 154 into the respective holes 150. Upon continued descent of the cap 146, the holes 162 are brought into alignment with the respective holes 150, whereupon the retainer pins 154 move from the holes 150 into the holes 162 under the bias of the springs 152. The cap 146 causes the cushion layer 160 to press the covering layer 142 on the base plate 144. The covering layer 142 is now retained in the cassette 140 by the retainer pins 154 which engage both the base plate 144 and the cap 146.

According to Japanese Laid-Open Patent Publication No. 2003-207864 and Japanese Laid-Open Patent Publication No. 2003-270747, the stimulable phosphor sheet 106 is simply placed in abutment against the frame 124 in the cassette 100. Therefore, the stimulable phosphor sheet 106 tends to be easily displaced out of position when the cassette 100 is vibrated.

The back plate 104 of the cassette 100 accommodates a number of parts, such as the springs 110a, 110b, 112a, 112b, to keep the stimulable phosphor sheet 106 as closely to the chest wall of the subject as possible. Accordingly, the cassette 100 is structurally complex and highly costly to manufacture.

According to Japanese Laid-Open Patent Publication No. 6-19021, the covering layer 142 is pressed simply by the cap 146 through the cushion layer 160. Therefore, the covering layer 142 is also liable to be easily displaced out of position upon vibration of the cassette 140. In addition, as the cassette 140 is made up of a number of parts such as the springs 152, the retainer pins 154, and the cushion layer 160, the cassette 140 is of a complex structure and is highly expensive to manufacture.

SUMMARY OF THE INVENTION

It is an object of the present invention to provide a cassette for use in radiation image forming apparatus, which is of a simpler structure, is capable of more reliably positioning a radiation image recording medium therein, and can be manufactured less costly.

According to the present invention, there is provided a cassette for use in radiation image forming apparatus, comprising a housing for storing a radiation image recording medium therein, a lid openably and closably mounted on the housing, the housing having side walls extending from respective ends of the housing in directions perpendicular to a surface of the housing, and biasing means disposed between one side of the radiation image recording medium and one of the side walls of the housing, for pressing the one side of the radiation image recording medium against the one of the side walls of the housing.

When the side of the radiation image recording medium is pressed against the side wall of the housing by the biasing means, the radiation image recording medium is reliably positioned in the cassette. Therefore, no special fixture needs to be installed in the housing, and hence the number of parts required to position and hold the radiation image recording medium is greatly reduced. The cassette can thus be manufactured at a low cost.

If the biasing means is integrally combined with the radiation image recording medium, then the radiation image recording medium can reliably be positioned and held in the cassette simply by inserting the radiation image recording medium into the cassette. Thus, the radiation image recording medium can easily be inserted into the cassette, so that the burden on the operator of the cassette can be lessened.

If the biasing means is mounted on a portion of the one side of the radiation image recording medium which corresponds to an openable and closable region of the lid, then when the radiation image recording medium is placed in the cassette, a side of the radiation image recording medium which is free of the biasing means contacts or is positioned near the side wall of the housing. If the side wall of the housing which is near the side of the radiation image recording medium which is free of the biasing means is placed along a subject, then the radiation image recording medium is placed closely to the subject, allowing radiation image information of the subject to be recorded more accurately on the radiation image recording medium.

The biasing means may comprise a resilient member. When the resilient member is used as the biasing means, the radiation image recording medium can easily be inserted into and removed from the cassette, so that the burden on the operator of the cassette can be lessened.

The biasing means may comprise a first slanted surface disposed on the one side of the radiation image recording medium and inclined inwardly of the housing from the lid toward the housing, and a second slanted surface disposed on the one of the side walls of the housing complementarily to the first slanted surface. The radiation image recording medium can easily be inserted into the cassette along the first slanted surface disposed on the one side of the radiation image recording medium and the second slanted surface disposed on the one of the side walls of the housing.

The cassette may further comprise a resilient member disposed on a portion of the lid which is near the first slanted surface, for pressing the first slanted surface against the second slanted surface to place the radiation image recording medium into the housing when the lid is closed over the housing. With this arrangement, even if the radiation image recording medium and the housing have tolerances, when the lid presses the radiation image recording medium through the resilient member, the radiation image recording medium can reliably be placed in the cassette.

The cassette may include at least a portion made of a biodegradable resin. Accordingly, while the portion of the cassette can be used just like an ordinary synthetic resin, and the portion will finally be decomposed into water and carbon dioxide by microorganisms in nature after use. Therefore, the portion of the cassette, which is made of a biodegradable resin, is environment-friendly.

According to the present invention, when the side of the radiation image recording medium is pressed against the side wall of the housing by the biasing means, the radiation image recording medium is reliably positioned in the cassette. Therefore, no special fixture needs to be installed in the housing, and hence the number of parts required to position and hold the radiation image recording medium is greatly reduced. The cassette can thus be manufactured at a low cost.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Cassettes for use in radiation image forming apparatus according to preferred embodiments of the present invention will be described below with reference to FIGS. 1 through 12.

Figure 1:
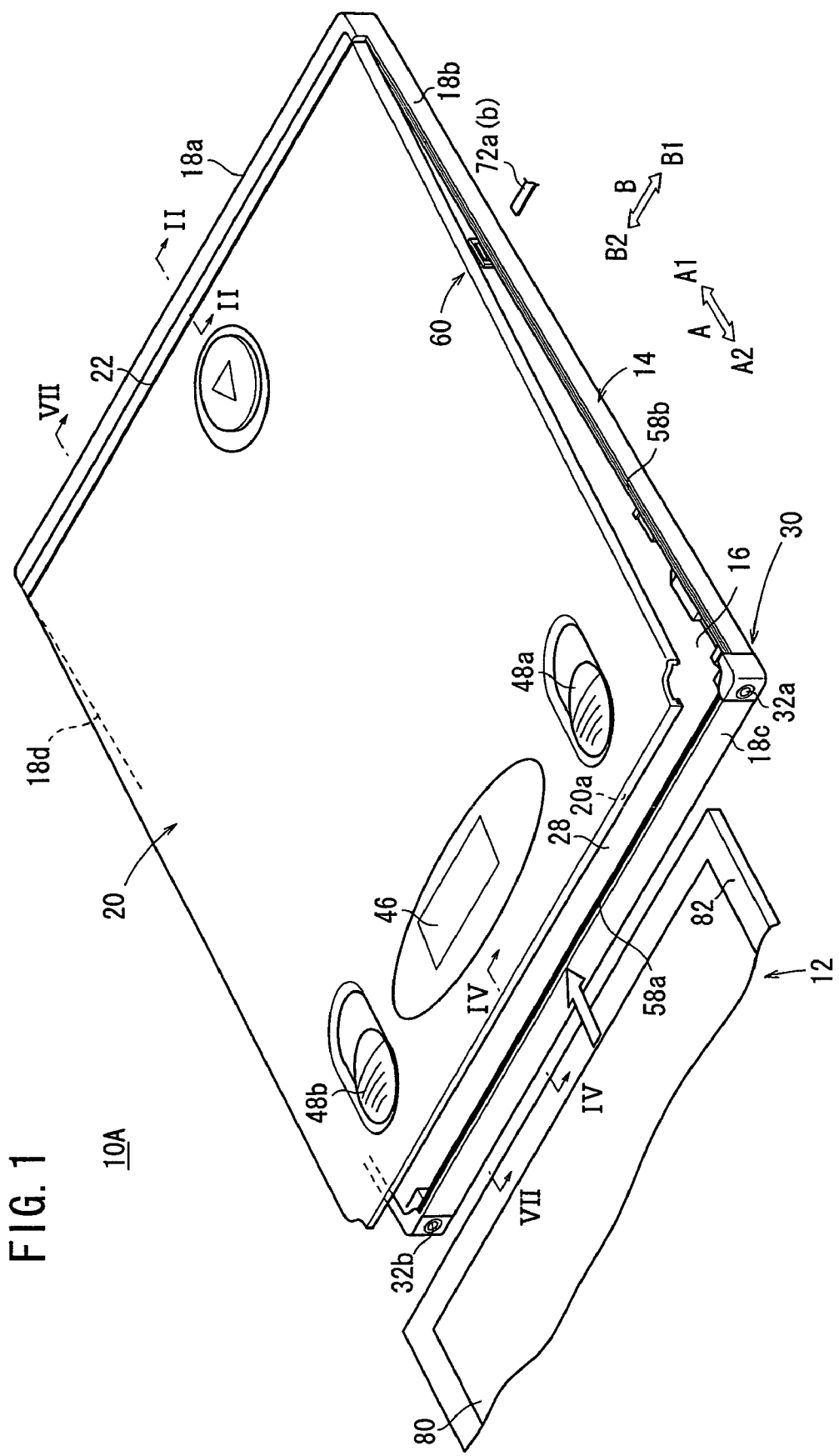
FIG. 1 is a perspective view of a cassette for use in radiation image forming apparatus according to a first embodiment of the present invention.

As shown in FIG. 1, a cassette 10A for use in radiation image forming apparatus according to a first embodiment of the present invention has a housing 14 for housing a stimulable phosphor sheet (radiation image recording medium) 12, the housing 14 serving as an irradiation surface, and a lid 20 openably and closably hinged on a side wall 18a which is one of the four side walls 18a through 18d of the housing 14. The side wall 18a and the lid 20 are swingably joined to each other by a hinge 22 of synthetic resin.

Figure 2:
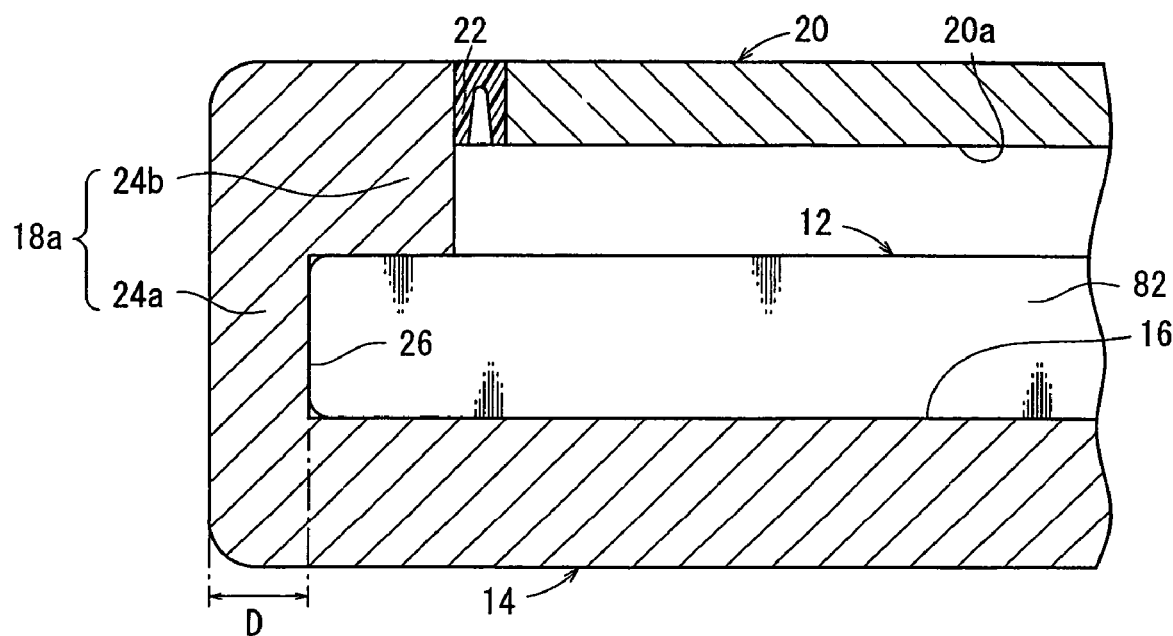
FIG. 2 is a cross-sectional view taken along line II-II of FIG. 1.

The four side walls 18a through 18d extend perpendicularly to a bottom surface 16 of the housing 14. As shown in FIG. 2, the side wall 18a has a first portion 24a extending from the bottom surface 16 and a second portion 24b extending from the first portion 24a and connected to the hinge 22, the second portion 24b being thicker than the first portion 24a. A side surface of the second portion 24b, a side surface of the first portion 24a, and the bottom surface 16 jointly define a recess 26 for inserting a portion of the stimulable phosphor sheet 12 therein. The first portion 24a has a width D that is preferably set to 1 mm or less.

As shown in FIG. 1, the side wall 18c, which is positioned opposite to the side wall 18a, has an opening 28 defined therein for the insertion and removal of the stimulable phosphor sheet 12. Presser pin insertion holes 32a, 32b for unlocking a lid lock mechanism 30, to be described later, are defined in respective corners that are positioned on the opposite sides of the opening 28.

Figure 3:
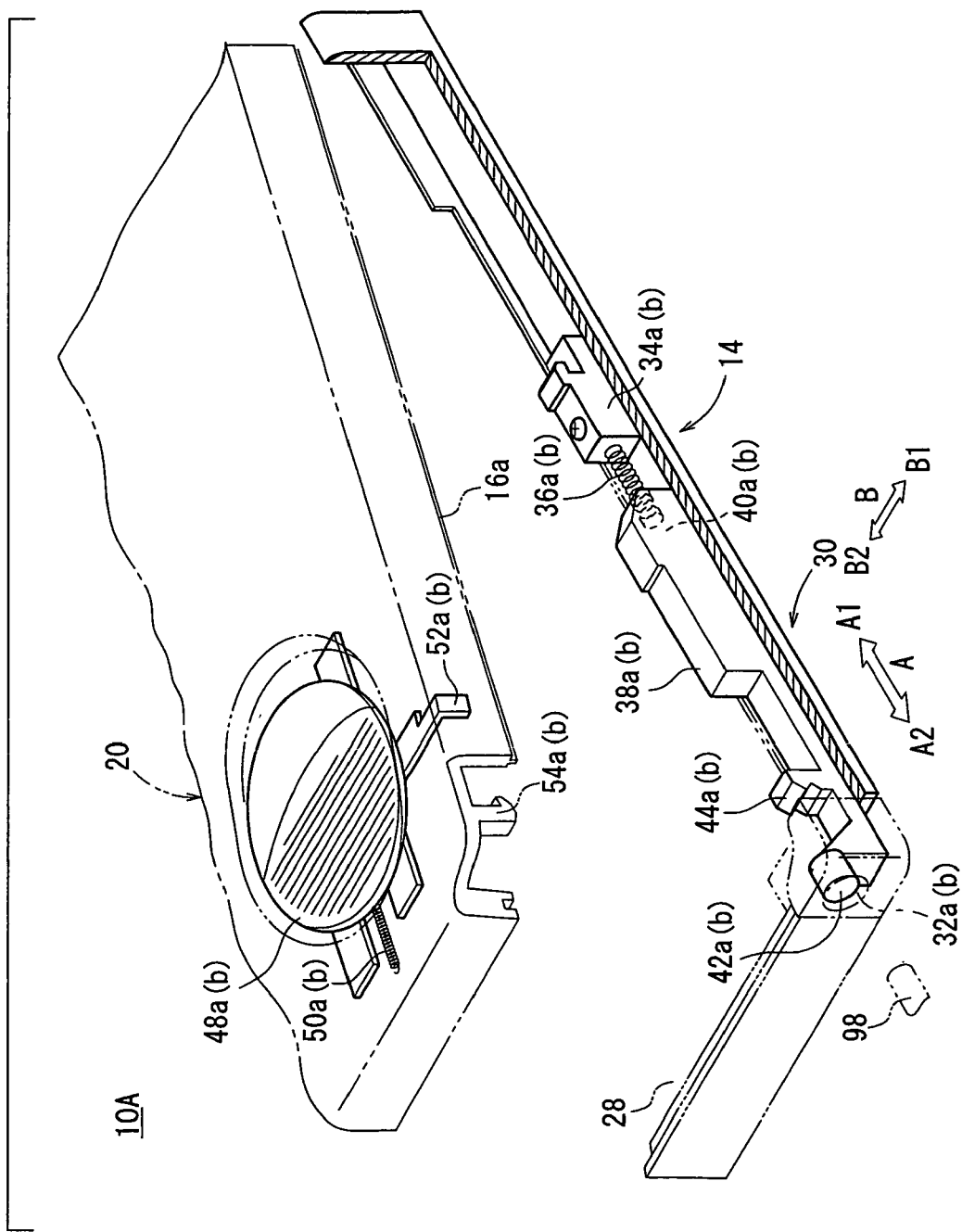
FIG. 3 is a perspective view of a lid lock mechanism of the cassette.

As shown in FIG. 3, the lid lock mechanism 30 has fixed blocks 34a, 34b fixedly mounted on the housing 14. Springs 36a, 36b have ends engaging the respective fixed blocks 34a, 34b and other ends inserted in respective holes 40a, 40b that are defined in respective sliders 38a, 38b. The sliders 38a, 38b have on respective distal ends thereof cylindrical pins 42a, 42b that can be inserted into the respective holes 32a, 32b in the housing 14, and also have respective lower lock fingers 44a, 44b which are spaced a given distance rearwardly, i.e., in the direction indicated by the arrow A1, from the pins 42a, 42b.

As shown in FIG. 1, the lid 20 has a bar-code reading window 46 and a pair of unlocking knobs 48a, 48b of the lid lock mechanism 30 disposed one on each side of the bar-code reading window 46. The unlocking knobs 48a, 48b are normally biased forwardly in the direction indicated by the arrow A2 by springs 50a, 50b, respectively (see FIG. 3).

Unlocking plates 52a, 52b engaging the respective sliders 38a, 38b are disposed beneath the unlocking knobs 48a, 48b, respectively. The lid 20 has a pair of upper lock fingers 54a, 54b projecting from an inner surface 20a thereof for engagement with the respective lower lock fingers 44a, 44b.

Figure 4:
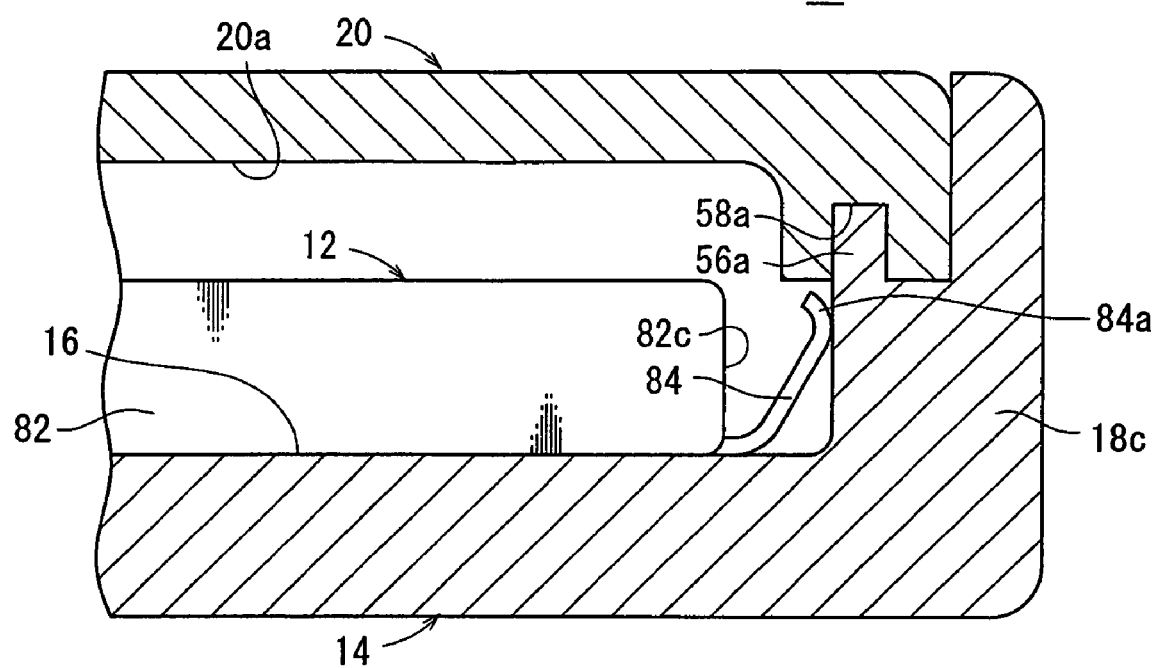
FIG. 4 is a cross-sectional view taken along line IV-IV of FIG. 1.
Figure 5:
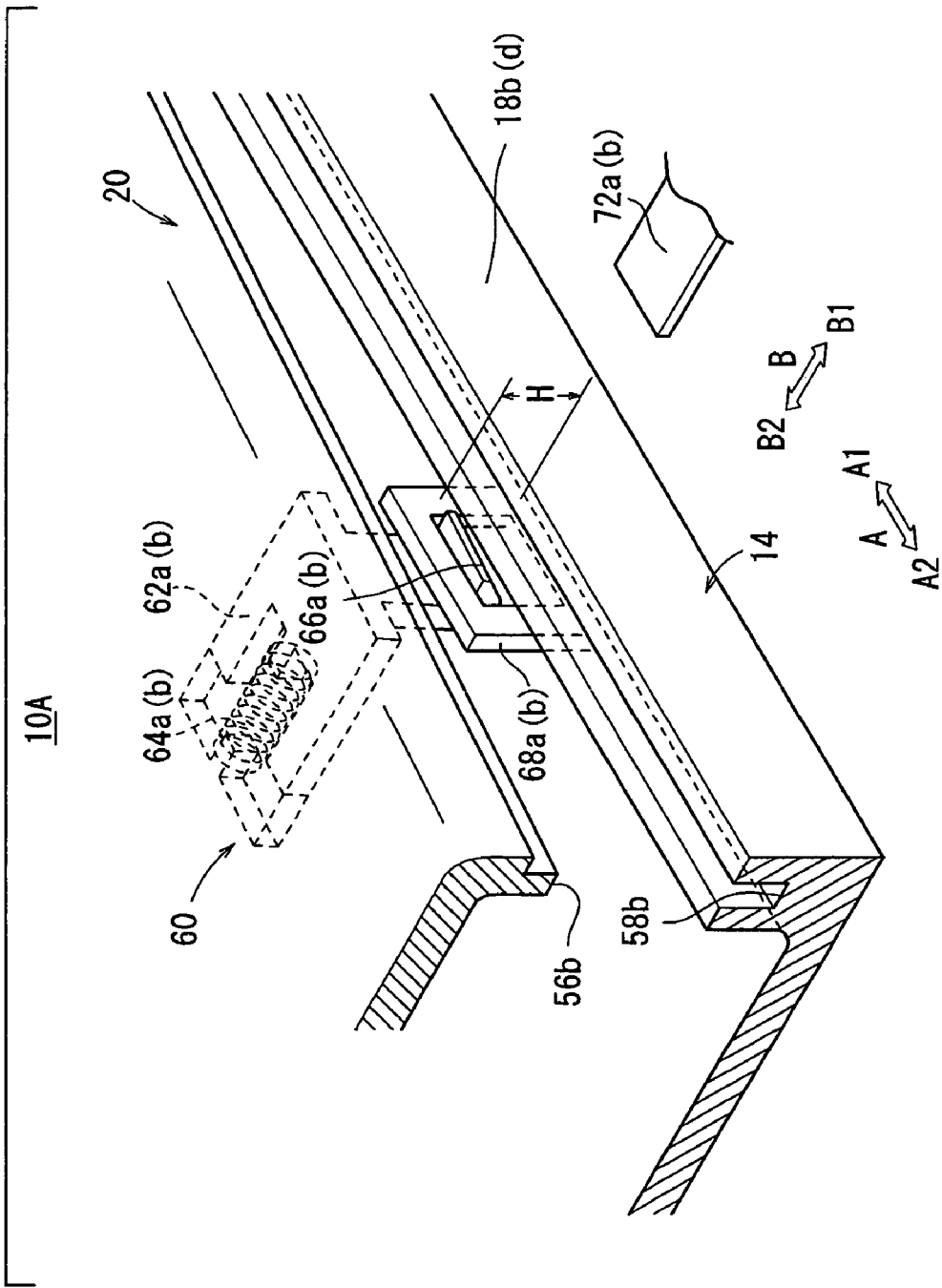
FIG. 5 is a perspective view of a stopper mechanism of the cassette.

As shown in FIGS. 1 and 4, the side wall 18c has a ridge 56a projecting toward the lid 20, which has a groove 58a that is open toward the ridge 56a. As shown in FIGS. 1 and 5, the housing 14 has grooves 58b in the side walls 18b, 18d, respectively, and the lid 20 has a stepped ridge 56b on its side edges facing the grooves 58b. As shown in FIGS. 1, 4, and 5, the ridges 56a, 56b are engageable in the grooves 58a, 58b, respectively.

As shown in FIGS. 1 and 5, a stopper mechanism 60 for releasably limiting the lid 20 to a certain opening angle with respect to the housing 14 is disposed between the housing 14 and the lid 20. The stopper mechanism 60 has slide members 62a, 62b disposed on opposite sides of the inner surface 20a of the lid 20 and movable back and forth in the directions indicated by the arrows B. The slide members 62a, 62b are normally biased to move outwardly by respective springs 64a, 64b. Specifically, the slide member 62a is normally biased to move in the direction indicated by the arrow B1, and the slide member 62b is normally biased to move in the direction indicated by the arrow B2. The slide members 62a, 62b have respective teeth 66a, 66b on their tip ends which extend toward the housing 14 and project toward the side walls 18b, 18d, respectively.

Engaging loops 68a, 68b for engaging the teeth 66a, 66b when the lid 20 is opened are mounted on the respective inner surfaces of the side walls 18b, 18d of the housing 14. The engaging loops 68a, 68b have respective substantially rectangular openings defined therein which are open in the direction indicated by the arrow B. When the lid 20 is opened from the housing 14, the teeth 66a, 66b engage with the respective upper edges of the openings of the engaging loops 68a, 68b. The openings have a vertical dimension or distance H which is set to a value that keeps the lid 20 at a predetermined opening angle with respect to the housing 14. When the slide members 62a, 62b are pushed inwardly by respective unlock bars 72a, 72b, i.e., when the slide member 62a is pushed in the direction indicated by the arrow B2 and the slide member 62b is pushed in the direction indicated by the arrow B1, the teeth 66a, 66b are displaced out of engagement with the engaging loops 68a, 68b, respectively.

Figure 6:
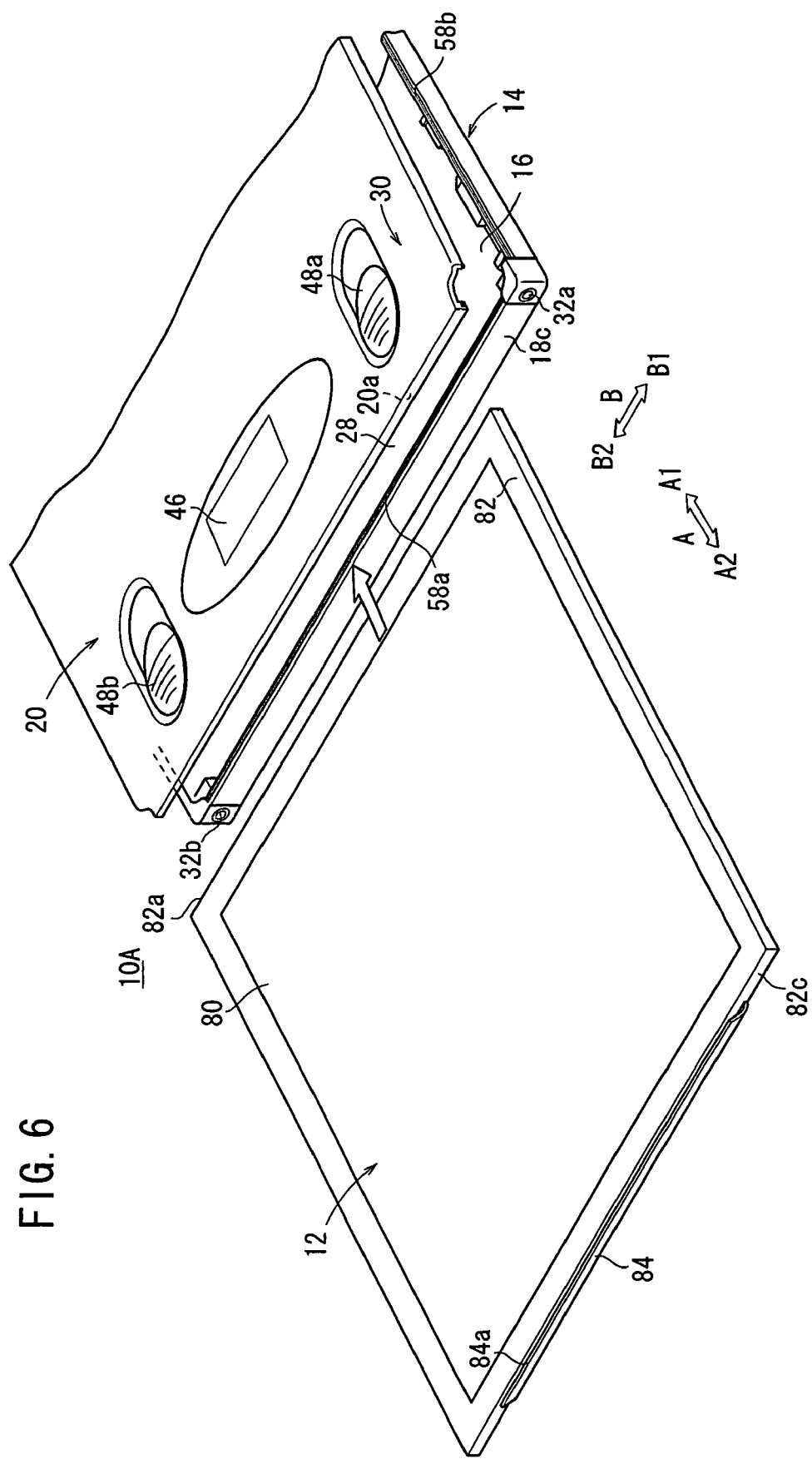
FIG. 6 is a perspective view showing the manner in which a stimulable phosphor sheet is inserted into the cassette.

As shown in FIGS. 1 and 6, the stimulable phosphor sheet 12 has a rectangular phosphor layer 80 serving as a radiation image recording area and a frame 82 surrounding the sides and corners of the phosphor layer 80.

The phosphor layer 80 may be, for example, a hard sheet comprising a support base made of a hard material such as glass or the like and a columnar phosphor material deposited on the support base. The phosphor layer 80 may be formed by a vacuum evaporation process, a sputtering process, a CVD process, or an ion plating process by which a stimulable phosphor is evaporated with heat and deposited on the support base within a vacuum container.

The phosphor layer 80 comprises a plurality of phosphor bodies in the form of columns substantially perpendicular to the plane of the phosphor layer 80 and optically independent of each other. Therefore, the phosphor layer 80 is highly sensitive to radiation that is applied thereto and is effective to reduce the granularity of an image recorded thereon and reduce the scattering of stimulating light for clear image quality.

The phosphor layer 80 may be a flexible sheet formed by coating a support base with a phosphor (see, for example, Japanese Laid-Open Patent Publication No. 2000-249795). The stimulable phosphor sheet 12 is not limited to the phosphor sheet with the frame 82, but may directly be the flexible sheet as disclosed in Japanese Laid-Open Patent Publication No. 2000-249795.

The frame 82 is made of a biodegradable resin such as polylactic acid, polycaprolactone, polybutylene succinate, or the like, or a thermoplastic resin such as ABS resin, polycarbonate resin, or a polymer alloy of ABS and polycarbonate (polycarbonate ABS resin). If the frame 82 is made of a biodegradable resin, then while it can be used in the cassette 10A just like an ordinary synthetic resin, it will finally be decomposed into water and carbon dioxide by microorganisms in nature after use. Therefore, the frame 82 made of a biodegradable resin is environment-friendly.

As shown in FIGS. 4 and 6, a spring 84 is mounted on a portion (side) 82c of the frame 82 which faces the side wall 18c of the housing 14. The spring 84 has a substantially L-shaped vertical cross-section which extends obliquely upwardly from the lower end of the side 82c and has a distal end 84a curved upwardly toward the upper end of the side 82c.

When the stimulable phosphor sheet 12 is moved forwardly in the direction indicated by the arrow in FIGS. 1 and 6 and placed in the housing 14 of the cassette 10A, the front side 82a of the stimulable phosphor sheet 12 abuts against the bottom of the recess 26 (see FIG. 2) in the side wall 18a of the housing 14, and the spring 84 presses the side wall 18c. Therefore, the stimulable phosphor sheet 12 is positioned and held in the housing 14 under the bias of the spring 84.

The spring 84 may be made of the same material as the frame 82 or may be made of a material different from the frame 82. The spring 84 may be bonded to the side 82c of the frame 82 or may be formed integrally with the frame 82. The spring 84 may not be of the curved shape described above, but may be in the form of a known spring such as a leaf spring or a helical spring.

A process by which the operator of the cassette 10A houses the stimulable phosphor sheet 12 in the cassette 10A will be described below.

First, as shown in FIG. 3, unlock pins 98 are inserted into the respective holes 32a, 32b in the housing 14. The pins 42a, 42b are pressed in the direction indicated by the arrow A1, moving the sliders 38a, 38b in the direction indicated by the arrow A1 against the bias of the springs 36a, 36b. The lower lock fingers 44a, 44b are now released from the respective upper lock fingers 54a, 54b, unlocking the lid lock mechanism 30.

With the lid lock mechanism 30 being thus unlocked, the lid 20 is opened about the hinge 22. As shown in FIG. 5, the slide members 62a, 62b of the stopper mechanism 60 also move in the opening direction in unison with the lid 20 until the teeth 66a, 66b of the slide members 62a, 62b abut against the upper edges of the engaging loops 68a, 68b. The lid 20 is kept at a desired opening angle with respect to the housing 14.

Figure 7:
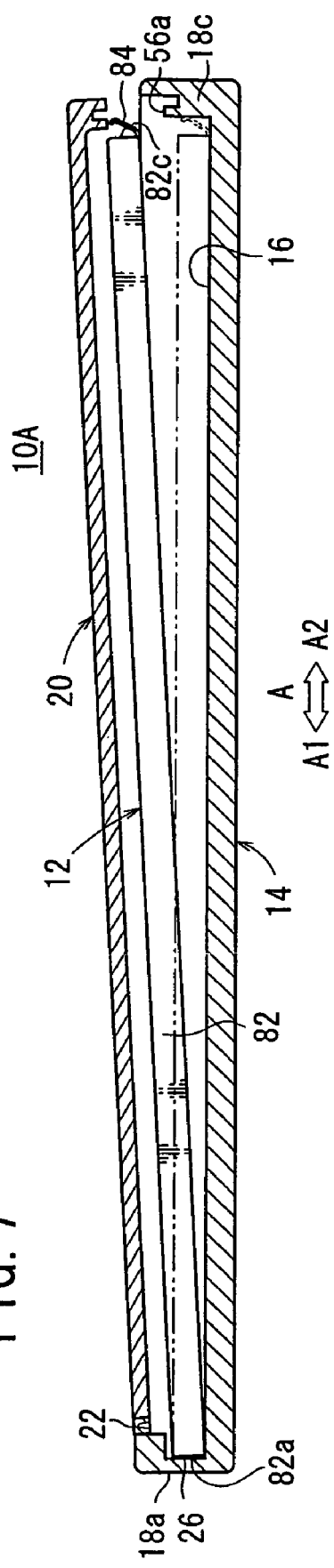
FIG. 7 is a cross-sectional view taken along line VII-VII of FIG. 1.

Then, as shown in FIGS. 6 and 7, the stimulable phosphor sheet 12 is inserted through the opening 28 into the housing 14 with the side 82a of the stimulable phosphor sheet 12 being oriented in the direction indicated by the arrow A1 and the side 82c thereof being oriented in the direction indicated by the arrow A2. After it is confirmed that the side 82a of the stimulable phosphor sheet 12 is inserted in the recess 26 (see FIG. 2) defined in the side wall 18a, the side 82c of the stimulable phosphor sheet 12 is lowered toward the bottom surface 16 of the housing 14 until a portion of the spring 84 contacts the side wall 18c.

Then, the lid 20 is pressed toward the housing 14. The upper lock fingers 54a, 54b on the inner surface 20a of the lid 20 are pressed against the lower lock fingers 44a, 44b of the sliders 38a, 38b, pushing the lower lock fingers 44a, 44b in the direction indicated by the arrow A1. Upon continued descent of the lid 20 toward the housing 14, the sliders 38a, 38b are displaced in the direction indicated by the arrow A1, and then moved back in the direction indicated by the arrow A2 under the bias of the springs 36a, 36b. The lower lock fingers 44a, 44b are brought into engagement with the upper lock fingers 54a, 54b, locking the lid 20 on the housing 14.

At this time, as shown in FIGS. 4 and 7, the depression of the lid 20 toward the housing 14 lowers the stimulable phosphor sheet 12 toward the bottom surface 16, and also lowers the spring 84 in unison with the stimulable phosphor sheet 12 while pressing the side wall 18c. The stimulable phosphor sheet 12 is now positioned and held in a space defined by the housing 14 and the lid 20 by the spring 84, as indicated by the dot-and-dash lines in FIG. 7.

The above process is manually performed by the operator. However, the above process may be automatically performed when the cassette 10A is loaded in a known image recording apparatus (not shown).

Figure 8:
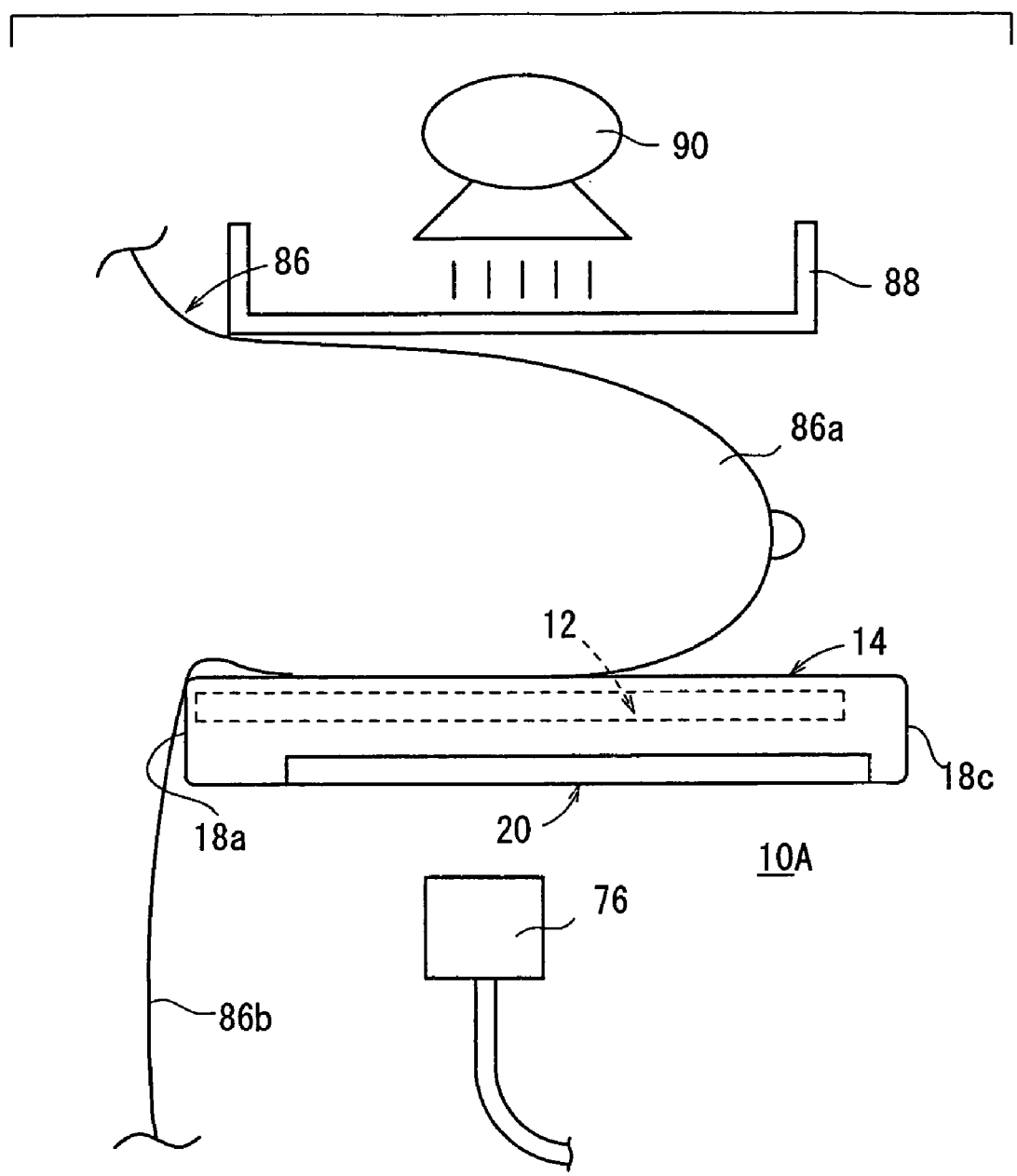
FIG. 8 is a side elevational view showing the manner in which radiation image information is recorded on the stimulable phosphor sheet in the cassette.
Figure 9:
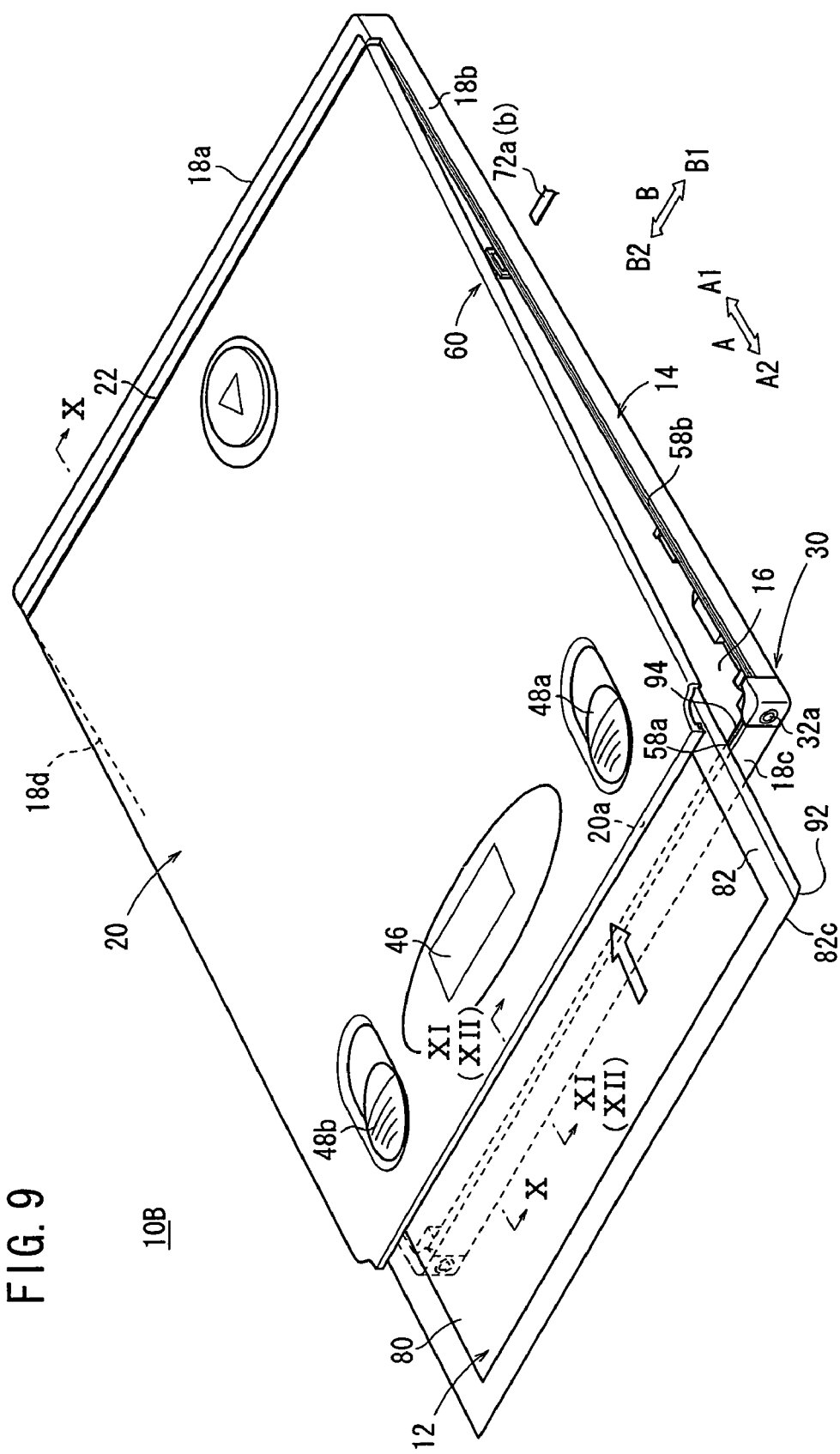
FIG. 9 is a perspective view of a cassette for use in radiation image forming apparatus according to a second embodiment of the present invention.
Figure 10:
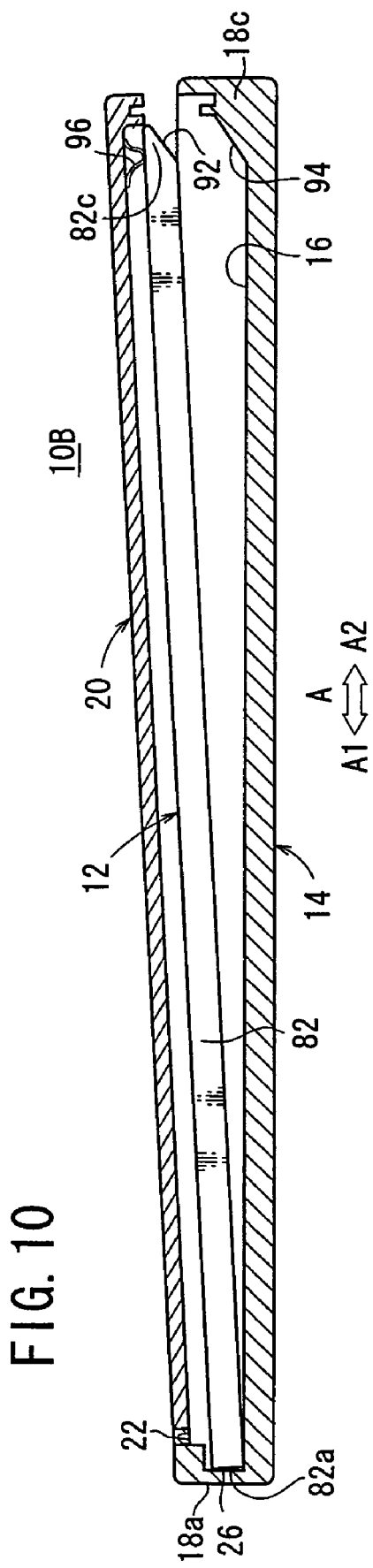
FIG. 10 is a cross-sectional view taken along line X-X of FIG. 9.
Figure 11:
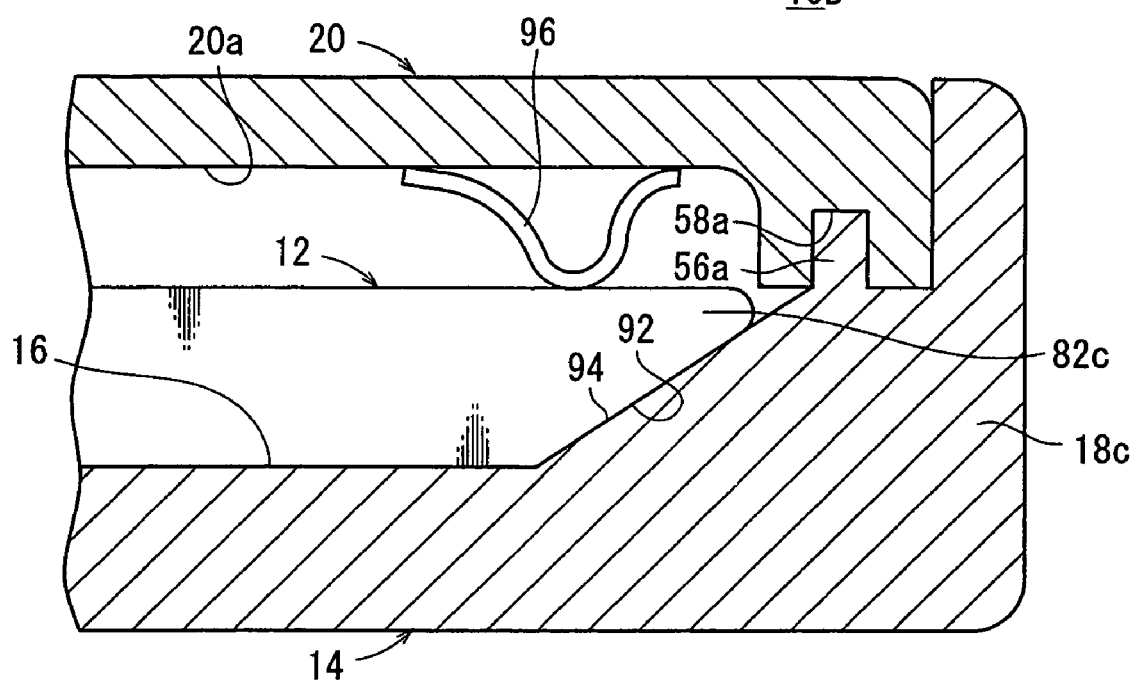
FIG. 11 is a cross-sectional view taken along line XI-XI of FIG. 9.

FIG. 8 shows the manner in which radiation image information of a breast 86a of a human body 86 as a subject is recorded on the stimulable phosphor sheet 12 that is housed in the cassette 10A. As shown in FIG. 8, a presser plate 88 is held against an upper portion of the breast 86a, and the housing 14 of the cassette 10A is held against a lower portion of the breast 86a, with the side wall 18a of the cassette 10A being placed against the chest wall 86b below the breast 86a. The breast 86a is thus sandwiched between the presser plate 88 and the cassette 10A. Then, a radiation emitted from a radiation tube 90 disposed above the breast 86a is applied to the breast 86a, recording radiation image information of the breast 86a on the stimulable phosphor sheet 12. The intensity of the radiation that has passed through the cassette 10A is detected by a sensor 76.

For removing the stimulable phosphor sheet 12 with the radiation image information recorded thereon from the cassette 10A, the cassette 10A is loaded into a radiation image reading apparatus (not shown). Then, as shown in FIG. 3, the unlock pins 98 are inserted into the respective holes 32a, 32b in the housing 14. After the lower lock fingers 44a, 44b are released from the upper lock fingers 54a, 54b, the lid lock mechanism 30 is unlocked. As shown in FIG. 1, the lid 20 is opened about the hinge 22, and is kept at the desired opening angle with respect to the housing 14 by the stopper mechanism 60.

As shown in FIG. 4, since the spring 84 is curved in the substantially L-shaped cross-sectional shape, the spring 84 undergoes a force acting from the stimulable phosphor sheet 12 toward the side wall 18c and a force acting from the bottom surface 16 toward the lid 20. When the lid 20 is open, the spring 84 is moved from the position indicated by the dot-and-dash lines to the position above the side wall 18c (the ridge 56a) under the above two forces. The side 82c of the stimulable phosphor sheet 12 is now lifted from the bottom surface 16 toward the opening 28. Then, the stimulable phosphor sheet 12 is removed from the cassette 10A by a suction mechanism (not shown), and the radiation image information recorded on the stimulable phosphor sheet 12 is read by the radiation image reading apparatus (not shown).

With the cassette 10A, the side 82c of the stimulable phosphor sheet 12 is fixed to the side wall 18c of the housing 14 by the spring 84 mounted on the side 82c, thereby positioning and holding the stimulable phosphor sheet 12 in the cassette 10A. Therefore, no special fixture needs to be installed in the housing 14 for positioning and holding the stimulable phosphor sheet 12 in the cassette 10A, and hence the number of parts required to position and hold the stimulable phosphor sheet 12 in the cassette 10A is reduced. The cassette 10A can thus be manufactured at a low cost.

Since the spring 84 is mounted on the frame 82 of the stimulable phosphor sheet 12, the stimulable phosphor sheet 12 can be positioned and held in the cassette 10A when the stimulable phosphor sheet 12 is inserted into the cassette 10A. Thus, the stimulable phosphor sheet 12 can easily be inserted into and removed from the cassette 10A, so that the burden on the operator of the cassette 10A can be lessened.

When the stimulable phosphor sheet 12 is inserted into the cassette 10A such that the spring 84 faces the side wall 18c of the housing 14, the side 82a which is free of the spring 84 is inserted into the recess 26. If the side wall 18a of the cassette 10A is placed along the chest wall 86b of the human body 86, then the stimulable phosphor sheet 12 is placed closely to the chest wall 86b, allowing the radiation image information to be recorded more accurately on the stimulable phosphor sheet 12.

A cassette 10B for use in radiation image forming apparatus according to a second embodiment-of the present invention will be described below with reference to FIGS. 9 through 12. Those parts of the cassette 10B which are identical to those of the cassette 10A according to the first embodiment are denoted by identical reference characters, and will not be described in detail below.

The cassette 10B is similar to the cassette 10A except that the side 82c of the stimulable phosphor sheet 12 has a first slanted surface 92, the side wall 18c of the housing 14 has a second slanted surface 94 that is complementary to the first slanted surface 92, and a spring 96 (resilient member) is mounted on a portion of the lid 20 in the vicinity of the side 82c of the stimulable phosphor sheet 12.

Specifically, the first slanted surface 92 on the side 82c of the stimulable phosphor sheet 12 is inclined inwardly of the housing 14 from the lid 20 toward the bottom surface 16. The second slanted surface 94 on the side wall 18c of the housing 14 is inclined complementarily to the first slanted surface 92 from the ridge 56a toward the bottom surface 16. When the stimulable phosphor sheet 12 is placed along the bottom surface 16 and the side wall 18c, the first slanted surface 92 is superposed on the second slanted surface 94.

The spring 96 is mounted on the lid 20 at a position near the side 82c of the frame 82. The spring 96 comprises a substantially convex leaf spring having opposite ends fixed to the lid 20 and a central portion curved convex toward the bottom surface 16.

For housing the stimulable phosphor sheet 12 in the cassette 10B, the stimulable phosphor sheet 12 is inserted through the opening 28 into the housing 14 with the lid 20 being open with respect to the housing 14. The side 82a of the stimulable phosphor sheet 12 is inserted into the recess 26 and the stimulable phosphor sheet 12 is lowered toward the bottom surface 16 until the first slanted surface 92 is brought into contact with the second slanted surface 94.

Then, the lid 20 is lowered toward the housing 14. The stimulable phosphor sheet 12 is pressed against the bottom surface 16 by the lid 20 under the bias of the spring 96. As the first slanted surface 92 moves along the second slanted surface 94, the stimulable phosphor sheet 12 moves toward the side wall 18a.

Then, when the lid 20 is closed, the stimulable phosphor sheet 12 is positioned and held in the direction in which it is inserted, by the second slanted surface 94. The stimulable phosphor sheet 12 is now positioned and held on the bottom surface 16.

For removing the stimulable phosphor sheet 12 with the radiation image information recorded thereon from the cassette 10B, the lid 20 is opened from the housing 14. As the lid 20 is open, the spring 96 is moved in unison with the lid 20 upwardly away from the stimulable phosphor sheet 12. Therefore, the stimulable phosphor sheet 12 is released from the constrained state, and the side 82c thereof is lifted from the bottom surface 16 toward the opening 28. Then, the stimulable phosphor sheet 12 is removed from the cassette 10B by a suction mechanism (not shown), and the radiation image information recorded on the stimulable phosphor sheet 12 is read by the radiation image reading apparatus (not shown).

With the cassette 10B according to the second embodiment, the side 82c of the stimulable phosphor sheet 12 has the first slanted surface 92 and the side wall 18c of the housing 14 has the second slanted surface 94 that is complementary to the first slanted surface 92. When the stimulable phosphor sheet 12 is inserted into the cassette 10B, the first slanted surface 92 moves along the second slanted surface 94, placing the stimulable phosphor sheet 12 neatly into the cassette 10B. The stimulable phosphor sheet 12 can thus be housed in and removed from the cassette 10B with ease.

The stimulable phosphor sheet 12 is positioned and held in the cassette 10B when the first slanted surface 92 is superposed on the second slanted surface 94. Therefore, the number of parts required to position and hold the stimulable phosphor sheet 12 in the cassette 10B is reduced. The cassette 10B can thus be manufactured at a low cost.

When the stimulable phosphor sheet 12 is housed in the cassette 10B, the stimulable phosphor sheet 12 is pressed toward the bottom surface 16 by the spring 96 mounted on the lid 20. The stimulable phosphor sheet 12 can thus be positioned and held smoothly in the cassette 10B. Even if the stimulable phosphor sheet 12 and the housing 14 have tolerances, since the stimulable phosphor sheet 12 is positioned and held against the bottom surface 16 under the pressing forces from the spring 96, the stimulable phosphor sheet 12 is stably positioned and held in the cassette 10B.

Figure 12:
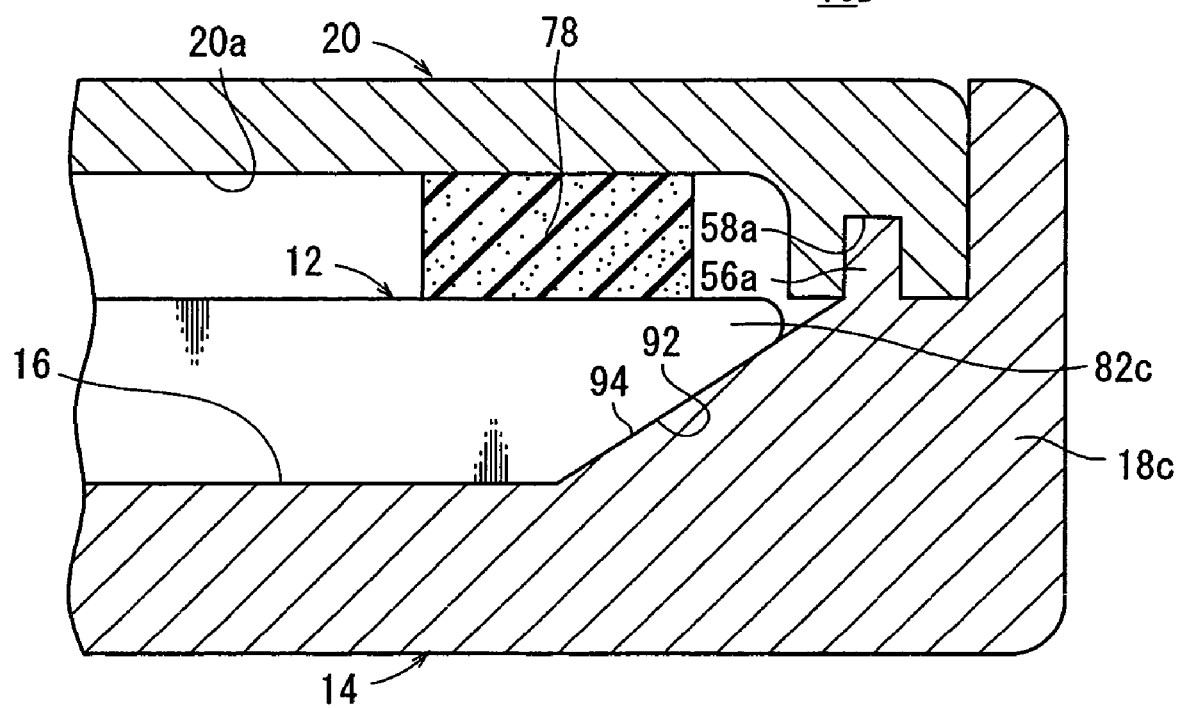
FIG. 12 is a cross-sectional view taken along line XII-XII of FIG. 9.
Figure 13:
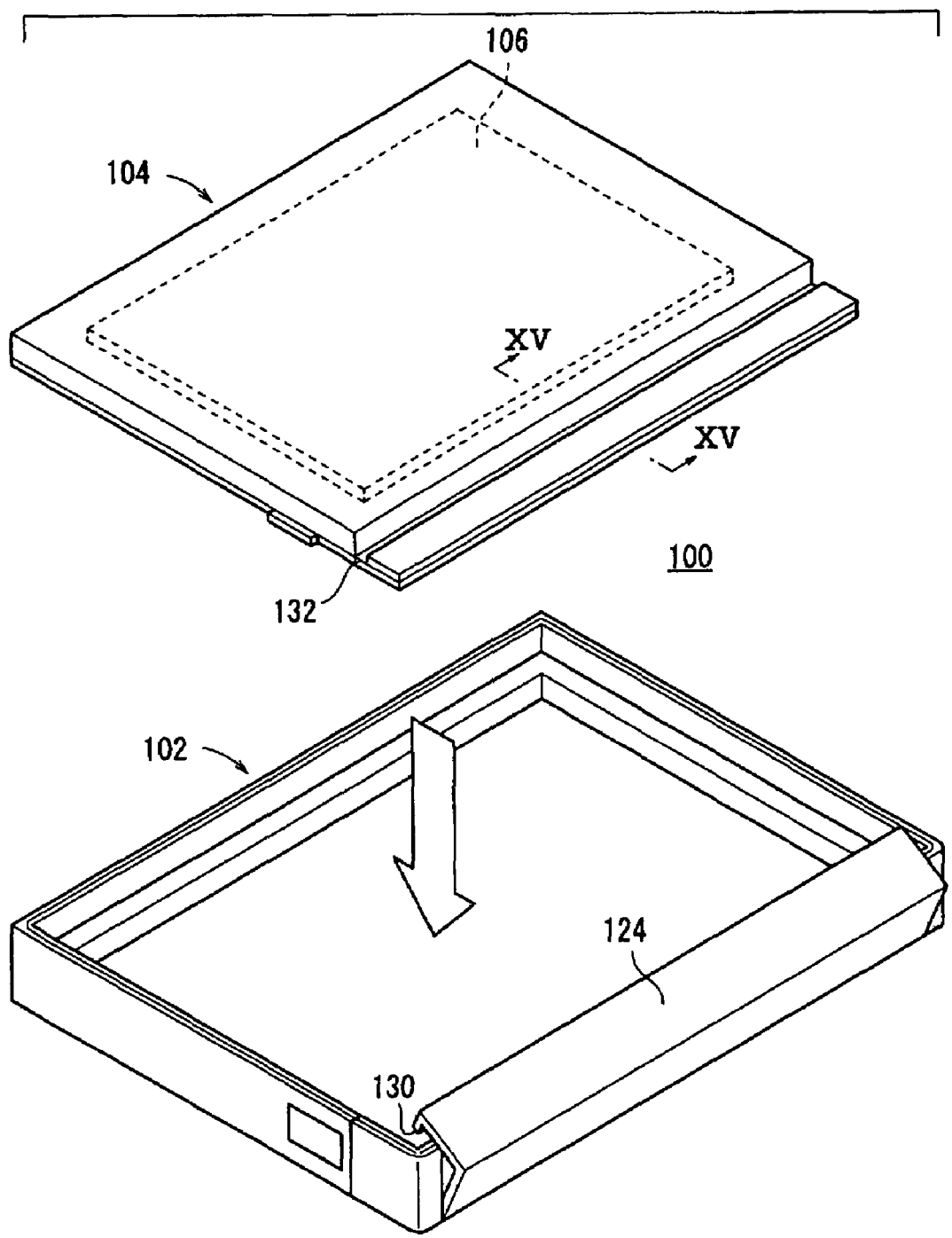
FIG. 13 is a perspective view of a conventional cassette for use in radiation image forming apparatus.
Figure 14:
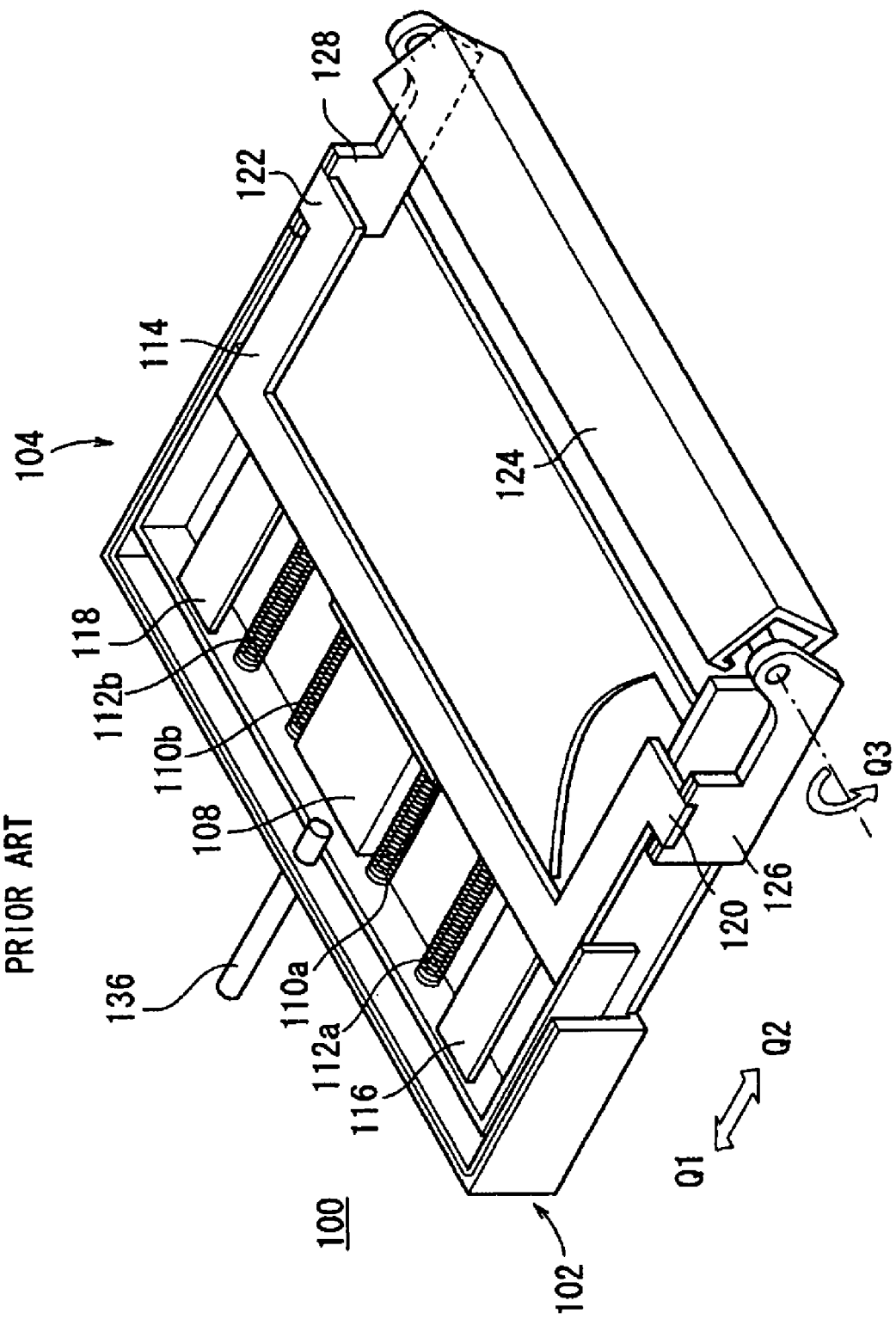
FIG. 14 is a perspective view the interior of the cassette shown in FIG. 13.
Figure 15:
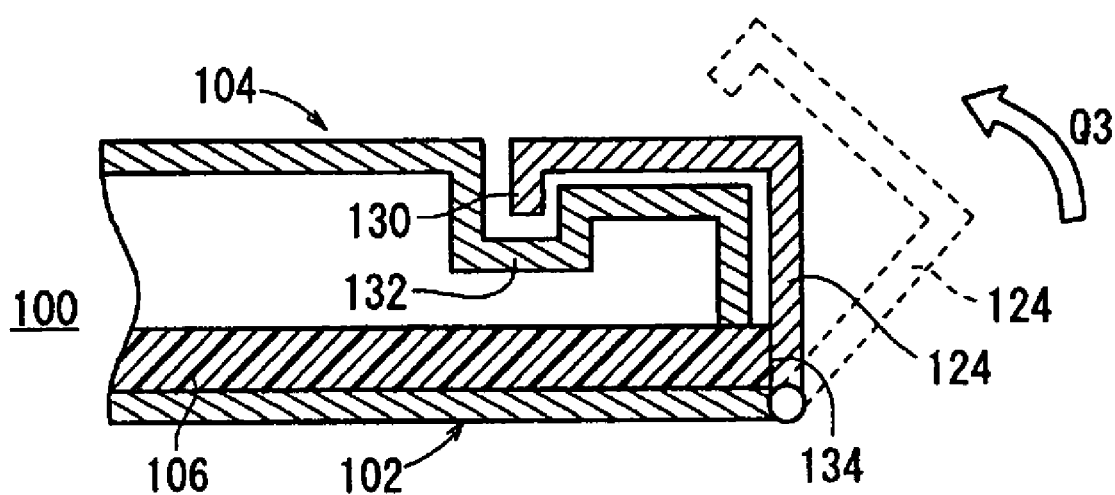
FIG. 15 is a cross-sectional view taken along line XV-XV of FIG. 13.
Figure 16:
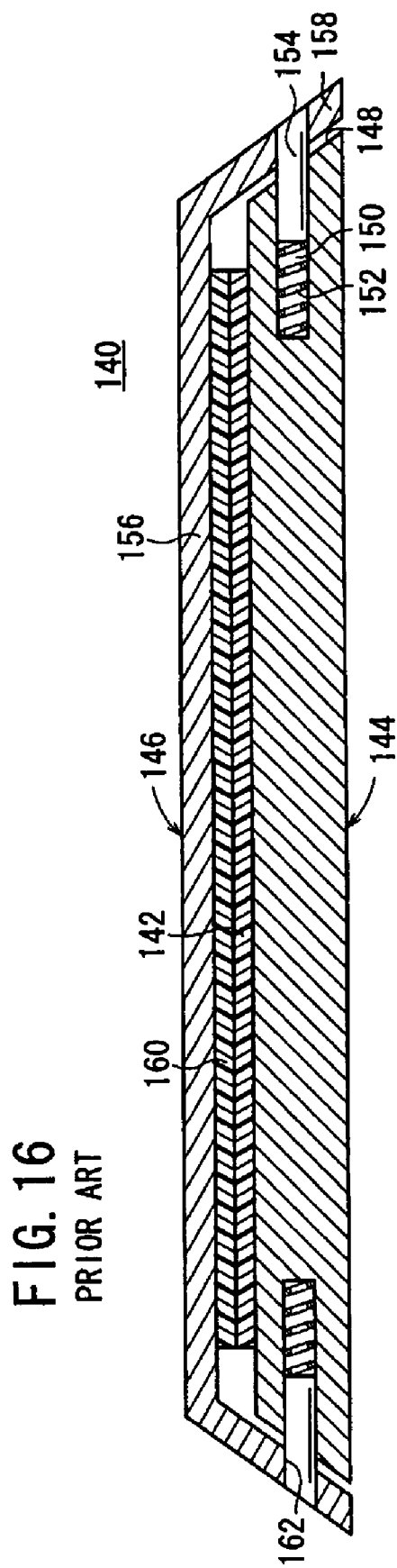
FIG. 16 is a cross-sectional view of another conventional cassette for use in radiation image forming apparatus.

As shown in FIG. 12, a sponge 78 may be used in place of the spring 96 in the cassette 10B for achieving the advantages described above.

In the above embodiments, a stimulable phosphor sheet has been described as the radiation image recording medium. However, the present invention is applicable to cassettes for storing various other recording mediums including a photographic film, etc.

Although certain preferred embodiments of the present invention have been shown and described in detail, it should be understood that various changes and modifications may be made therein without departing from the scope of the appended claims.

What is claimed is:

1. A cassette for use in radiation image forming apparatus, comprising:
   a housing for storing a radiation image recording medium therein;
   a lid openably and closably mounted on said housing;
   said housing having side walls extending from respective ends of the housing in directions perpendicular to a surface of the housing; and
   biasing means disposed between one side of said radiation image recording medium and one of said side walls of the housing, for pressing said one side of said radiation image recording medium against said one of the side walls of the housing,
   wherein said biasing means is mounted on a portion of said one side of said radiation image recording medium which corresponds to an openable and closable region of said lid.

2. A cassette according to claim 1, wherein said biasing means is integrally combined with said radiation image recording medium.

3. A cassette according to claim 2, wherein said biasing means comprises a resilient member.

4. A cassette according to claim 3, wherein said biasing means comprises a spring.

5. A cassette according to claim 1, wherein said cassette includes at least a portion made of a biodegradable resin.

6. A cassette according to claim 5, wherein said portion of the cassette comprises a frame of said radiation image recording medium.

7. A cassette according to claim 5, wherein said biodegradable resin comprises a material selected from the group consisting of polylactic acid, polycaprolactone, and polybutylene succinate.

8. A cassette for use in radiation image forming apparatus, comprising:
   a housing for storing a radiation image recording medium therein;
   a lid openably and closably mounted on said housing;
   said housing having side walls extending from respective ends of the housing in directions perpendicular to a surface of the housing; and
   biasing means disposed between one side of said radiation image recording medium and one of said side wails of the housing, for pressing said one side of said radiation image recording medium against said one of the side wails of the housing,
   wherein said biasing means comprises:
   a first slanted surface disposed on said one side of said radiation image recording medium and inclined inwardly of said housing from said lid toward said housing; and
   a second slanted surface disposed on said one of the side walls of the housing complementarily to said first slanted surface.

9. A cassette according to claim 8, further comprising:
   a resilient member disposed on a portion of said lid which is near said first slanted surface, for pressing said first slanted surface against said second slanted surface to place said radiation image recording medium into said housing when said lid is closed over said housing.

10. A cassette according to claim 9, wherein said resilient member comprises a spring or a sponge.

11. A cassette for use in radiation image forming apparatus, comprising:
    a housing for storing a radiation image recording medium therein;
    a lid openably and closably mounted on said housing;
    said housing having side walls extending from respective ends of the housing in directions perpendicular to a surface of the housing; and
    biasing means disposed between one side of said radiation image recording medium and one of said side walls of the housing, for pressing said one side of said radiation image recording medium against said one of the side walls of the housing,
    wherein another one of said side walls which faces said one of said side walls has a first portion extending from an end of said housing and a second portion extending from said first portion and thicker than said first portion, and said end of said housing, said first portion, and said second portion jointly define a recess for inserting a portion of said radiation image recording medium therein.

* * * * *